Patented Oct. 1, 1929

1,729,765

UNITED STATES PATENT OFFICE

CLARENCE F. DINLEY, OF DETROIT, MICHIGAN

REMOVAL OF FOREIGN SUBSTANCES FROM METAL SURFACES

No Drawing.    Application filed February 11, 1925.   Serial No. 8,538.

This invention relates to the treatment of metal surfaces, especially of fabricated steel, whereby said surfaces are freed from foreign substances such as oil, grease and the like, along with rust, and all rust stimulants, and are left in a condition to receive and retain a protective coating of paint, enamel or the like.

The present usual method of preparing such surfaces for painting is either by the use of a sand blast, or by treating the metal with suitable liquid acid of various kinds usually containing alcohol as an oil displacer or solvent. Sometimes the two are used in conjunction.

The sand blast method is very injurious to the workmen who apply the treatment. The liquid acid treatment involves mechanical difficulties in securing the even distribution of the reagent upon the surface to be treated.

The thin liquid condition of the acid solution requires many applications to keep the metal wet during the sanding operation, and in addition to the above the acid solution penetrates all cracks and crevices from some of which it is impossible to completely remove it, and from which the acid later works out due to the action of the heat required to set the paint used. The acid which thus seeps out during the heating has a very deleterious effect on the permanency of the finished protective coating. This condition exists in spite of the fact that a large excess of water is used to remove this acid. The water used for this purpose (the metal being in a fairly clean condition) produces its usual effect and causes the metal to have a bronze discoloration, which is incipient rust; and while this condition may be overcome in the hands of an expert, it is rather difficult to eliminate this discoloration in practice.

My present invention involves the use of an aqueous paste in which are incorporated the rust and oil removing agents. This paste composition may be sprayed or otherwise applied to the surface in a continuous layer or coating, which thus remains upon the surface, and which before drying absorbs much of the dissolved rust and grease, and which after drying clings tenaciously to any softened rust or grease remaining on the surface, so that when in its dry condition it is brushed or flaked off, the complete removal of these substances from the metal surface is effected, thus calling for much less (if any) subsequent abrasion of the surface than in the previously described process.

The aqueous paste may be formed by adding water to any finely divided inert mineral substance, capable of producing the desired plastic mass. Various clays or similar substances may be employed, but I prefer to use cryolite, silica, alumina, powdered talc or fluor spar and the like.

As the rust-removing agent, I employ any of those acids which have the capacity of readily dissolving, or rendering harmless to paint, the iron oxides, chlorides or iron salts liable to be found upon metal surfaces. Most of the mineral acids, and also oxalic, acetic, tartaric and citric acids have this capacity. Phosphoric acid has long been used for this purpose. A mineral acid that forms water-soluble salts with iron may be employed singly or can be used in conjunction with organic acids capable of producing insoluble iron salts by double decomposition. For example tannic acid with sulphuric acid in the presence of iron results in the formation of insoluble iron tannate.

As a removing agent for the oil and grease which is usually found upon the surfaces of metal, I may employ any of the alcohols, ketones or esters which possess the capacity of dissolving or displacing the oil or grease. Various aromatic hydrocarbons also possess a similar capacity.

In order that the acqueous paste may remain a homogeneous mass and maintain the finely divided material in suspension, I prefer to add a metallic salt which when precipitated by the oil solvent will produce a flocculent coagulant having this effect. Many ferric and other metallic salts possess this quality.

I will now describe a preferred method of preparing my material:—To 250 cc. of water I add 32 grams of ferric phosphate and 45 cc. of 75% phosphoric acid. This is stirred until the ferric phosphate is fully dissolved. There is then added 200 grams of finely divided inert material, as for example a mixture of 125 grams of fuller's earth with 75 grams of kaolin. After this has been thoroughly stirred into the mixture there is added 250 cc. of denatured alcohol or other similar oil remover.

The proportions given above may be varied provided there be used a sufficient amount of the reagents to act upon the rust and grease, and provided also the materials be so proportioned as to produce an aqueous paste of the proper consistency to permit of easy application to the surface in an even layer, which will not run down a vertical surface, and which may be readily dried by application of a moderate temperature, and which when thus dried does not adhere too tenaciously to the metal, but is flaky and friable and therefore readily removable. While the phosphoric acid in the foregoing formula has hygroscopic properties, yet it is present only in a decidedly minor proportion as compared with the finely divided material, so that the residue of it left from reaction with the rust does not prevent the paste from drying to a friable coating or deposit on the metal surface to which it is applied, nor render the coating deposit sensibly or materially hygroscopic. On the contrary, the coating remains substantially dry and friable indefinitely.

The suspending agent (ferric phosphate) keeps the composition homogeneous when first applied, and prevents it from running or "sagging,"—notwithstanding the rather large proportion of liquid organic oil solvent.

To apply this material to the surface of metal objects I prefer to employ a spray, but it may be otherwise applied, as with a brush. If there is no hurry it may be permitted to air dry, but for ordinary purposes I prefer to place the object thus coated in an oven heated to a noninjurious drying temperature, by means of which the drying may be effected in a comparatively few minutes. The heat is further serviceable in hastening the reactions, and rendering the oil more easily absorbed. When thus dried the paste which I have described will be found not tenaciously adhesive, but in a flaky condition—quite friable and very readily removed by slight rubbing, as by steel wool.

During the drying process the reagents have softened or dissolved the rust, oil and grease upon the surface to which they are applied, and the finely divided inert material will be found to have absorbed into its substance some of these materials while the rest are softened and are tenaciously adherent to the dried paste when rubbed off, so that the metal surface is left in the desired clean condition. It may then be slightly abraded and lightly wiped to remove dust, and is then ready for painting or other treatment.

The finely divided material performs a combination of useful mechanical functions. It acts as the vehicle for securing the even application of the reagents to the surface of the metal and their maintenance in proper contact long enough for them to perform their function. It further acts as an absorbent taking to itself the dissolved materials which are to be removed. Further it clings with tenacity to softened, but unabsorbed particles of rust or grease, and when dry is friable and flaky, easily brushed off, carrying with it these adherent particles of foreign substances which it is desired to remove.

The finely divided substance or "vehicle" may be any finely divided mineral material that is not acted on chemically by the other substances employed when mixed with them to form the paste, and is thus "inert" or compatible with respect to the other ingredients. I have instanced a combination of fuller's earth with kaolin. These substances differ in particle fineness and I find that it is advantageous to either choose or produce a material possessing different particle finenesses, as such mixtures appear to be more absorbent and tenacious than would otherwise be the case, and yet have the capacity to dry out into a friable coating or deposit, as distinguished from too dense and adherent a coating.

Having thus described my invention, I claim:

1. A method of cleaning a metal surface of foreign substances such as rust and oil, and thus preparing the surface for painting; which method comprises applying to the surface an aqueous paste that includes rust solvent acid having the capacity of dissolving or rendering harmless to paint the iron oxides, chlorides, or other iron salts liable to be found upon metal surfaces, and a liquid organic oil and grease remover which has the capacity of displacing or dissolving the oil and grease on the surface, and finely divided solid mineral matter compatible with the other ingredients; drying the paste to a friable coating or deposit on the surface, thereby incorporating the foreign substances in such deposit; and removing the latter in its dried condition.

2. A method of cleaning a metal surface of foreign substances such as rust and oil, and thus preparing the surface for painting; which method comprises coating the surface with an aqueous paste that includes finely divided solid mineral matter which is compatible with the other ingredients of the paste hereinafter mentioned, and a liquid organic oil and grease remover which has the capacity of displacing or dissolving the oil and grease on the surface, and phosphoric acid in such minor proportion compared with said finely divided matter as not to render the coating materially hygroscopic; drying the paste to a friable coating or deposit on the surface, thereby incorporating the foreign substances in such deposit; and removing the latter in its dry, friable condition.

3. A method of cleaning a metal surface of foreign substances such as rust and oil, and thus preparing the surface for painting; which method comprises spraying on the surface a composition including rust solvent acid having the capacity of dissolving or rendering harmless to paint the iron oxides, chlorides, or other iron salts liable to be found upon metal surfaces, a liquid organic oil and grease remover which has the capacity of displacing or dissolving the oil and grease on the surface, finely divided solid mineral matter having absorbent properties and compatible with the other ingredients, and iron phosphate for a suspending agent for the finely divided matter, all in the form of an aqueous paste sufficiently fluid to give a continuous layer, yet kept homogeneous by the suspending agent; drying the paste to a friable coating or deposit on the surface, with absorption of the foreign substances by said finely divided matter; and removing the deposit in its dried condition.

In testimony whereof, I have hereunto signed my name at Philadelphia, Pennsylvania, this 10th day of February, 1925.

CLARENCE F. DINLEY.